(12) United States Patent
Norberg

(10) Patent No.: US 6,213,363 B1
(45) Date of Patent: *Apr. 10, 2001

(54) DEVICE FOR SUPPORTING ON THE BODY A HAND CONTROLLER UNIT FOR THE REMOTE CONTROL OF IMPLEMENTS, TOOLS, ROBOTS OR SIMILAR

(75) Inventor: Anders Norberg, Ersmark (SE)

(73) Assignee: Brokk AB, Skelleftea (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/335,329

(22) Filed: Jun. 17, 1999

(30) Foreign Application Priority Data

Jun. 18, 1998 (SE) .................................... 9802188

(51) Int. Cl.⁷ ........................................... A45F 5/14
(52) U.S. Cl. ......................... 224/270; 224/272; 224/185; 224/197; 224/930
(58) Field of Search ...................... 224/261, 262, 224/603, 604, 908, 910, 930, 270, 272, 197, 185; 108/43; 248/279.1, 281.11, 285.1, 286.1, 291.1; 312/222, 248, 325

(56) References Cited

U.S. PATENT DOCUMENTS

| | | | |
|---|---|---|---|
| 39,945 | * | 9/1863 | Monson ........................... 248/281.11 |
| 191,809 | * | 6/1877 | Moseley .......................... 248/281.11 |
| 232,068 | * | 9/1880 | Robinson .............................. 224/197 |
| 420,069 | * | 1/1890 | Hood et al. ..................... 248/281.11 |
| 541,061 | * | 6/1895 | Baumgartner et al. ........... 248/279.1 |
| 595,642 | * | 12/1897 | Miller ................................... 224/197 |
| 714,694 | * | 12/1902 | Holtz .............................. 248/281.11 |
| 876,159 | * | 1/1908 | Erickson ............................... 312/248 |
| 1,116,265 | * | 11/1914 | Graham ............................. 248/289.1 |
| 2,243,517 | * | 5/1941 | Adamson .......................... 248/279.1 |
| 2,498,428 | * | 2/1950 | Kruse ................................... 108/135 |
| 3,541,976 | * | 11/1970 | Rozas ................................... 224/270 |
| 3,610,622 | * | 10/1971 | Haroski .................................. 273/98 |
| 4,450,993 | * | 5/1984 | Ephraim .............................. 224/265 |
| 5,060,836 | * | 10/1991 | Bradford et al. ..................... 224/271 |
| 5,207,791 | * | 5/1993 | Scherbarth ........................... 273/148 |
| 5,230,452 | * | 7/1993 | Wagner ................................ 224/240 |
| 5,261,584 | * | 11/1993 | Albert .................................. 224/270 |
| 5,526,970 | * | 6/1996 | Yates .................................... 224/270 |
| 5,738,256 | * | 4/1998 | Goff et al. ............................ 225/185 |

* cited by examiner

Primary Examiner—Stephen Castellano
(74) Attorney, Agent, or Firm—John Lezdey & Assoc

(57) ABSTRACT

The invention relates to a device for supporting on the body a hand controller unit for the remote control of implements, tools, robots or similar, including a base section intended to be attached to the body by means of a hip belt or similar, at least one supporting arm arranged on the base section for supporting a hand controller unit and arranged to allow adjustment of the position of the controller unit in relation to the base section. To simplify adjustment of the hand controller unit, each supporting arm (6) includes a system of at least one first arm (7) and one second arm (8) that are located at a distance from one another and one above the other, and where the said arms are linked to the base section (3) by jointed connections to allow pivoting around an essentially horizontal axis when seen from the point of view of the operating position of the hand controller unit, whereby the hand controller unit is moveable in relation to the base section and guided by the directional and guidance device (11) that is active between a respective free end of the first and the second arm as well as the controller unit and that can be fixed in position in relation to the base section by means of a device (12) arranged on the directional and guidance device for locking the first and second arms (7, 8) included in the supporting arm to the hand controller unit (2).

4 Claims, 2 Drawing Sheets

DEVICE FOR SUPPORTING ON THE BODY A HAND CONTROLLER UNIT FOR THE REMOTE CONTROL OF IMPLEMENTS, TOOLS, ROBOTS OR SIMILAR

FIELD OF THE INVENTION

The present invention relates to a device for supporting on the body a hand controller unit for the remote control of implements, tools, robots or similar according to the introduction to claim 1.

BACKGROUND OF THE INVENTION

A requirement of devices of this type is that they should be designed so that they rest against the body in a comfortable manner and so that the user has a comfortable working position with both hands free to manoeuvre the commonly found control handles, the so-called joysticks, with which the hand controller units considered here are primarily equipped. As the requirement for how the hand controller unit supported on the body should be located to achieve a comfortable position from an operational point of view depends purely on individual circumstances and is guided not the least by the build of the user, it is desirable that the device is designed so that the hand controller unit is freely adjustable, i.e. adjustable at least in height, in direction towards and away from the body of the user, and is also possible to pivot or tilt towards or away from the body around its own axis to accommodate different angled positions in relation to the horizontal plane.

Known devices of the type specified above have, however, the disadvantage that setting or adjusting cannot be carried out with a simple turn of the hand, but that the adjustment of each range of movement of the hand controller unit must instead be made individually.

One objective of the present invention is thus to achieve an improved device of the type specified above where the controller unit can easily be adjusted and locked in the desired position.

This objective of the invention is achieved with a device that has the features specified in the characteristics section of claim 1.

SUMMARY OF THE INVENTION

According to a specially advantageous embodiment of the invention, the arms of the device are bow-shaped and preferably made from wire-like material or rod-like material with a small cross-section. The hand controller unit is supported between the shank-shaped parts of the bow-shaped arms and the bow-shaped arms are linked by pivoting connections with a base section carried on the body of the user on a waist section that unites the shank-shaped parts.

BRIEF DESCRIPTIONS OF THE DRAWINGS

Figure 1:
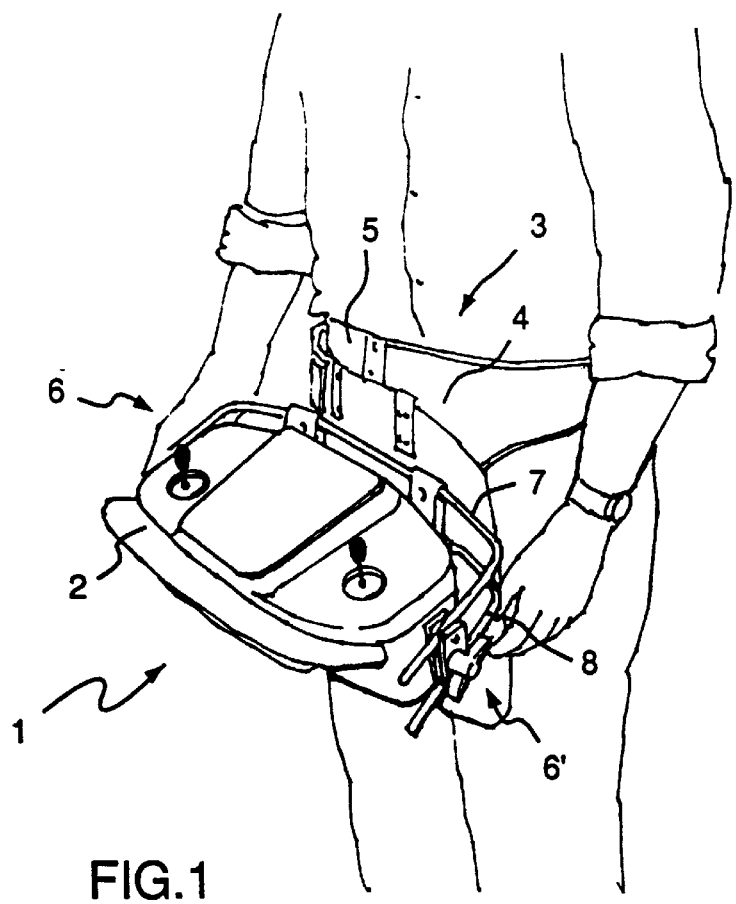
Figure 2:
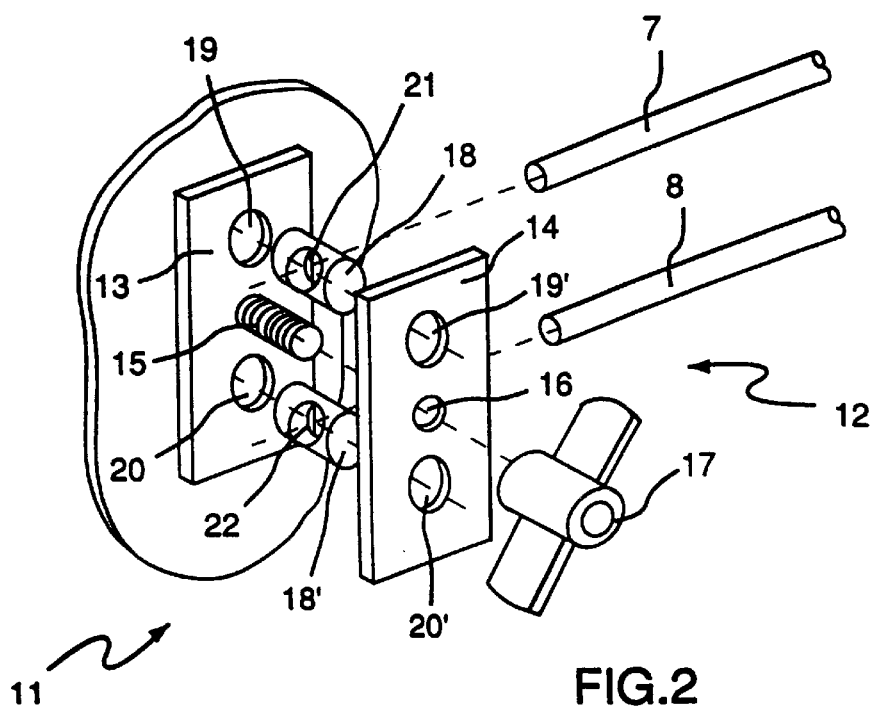
Figure 3:
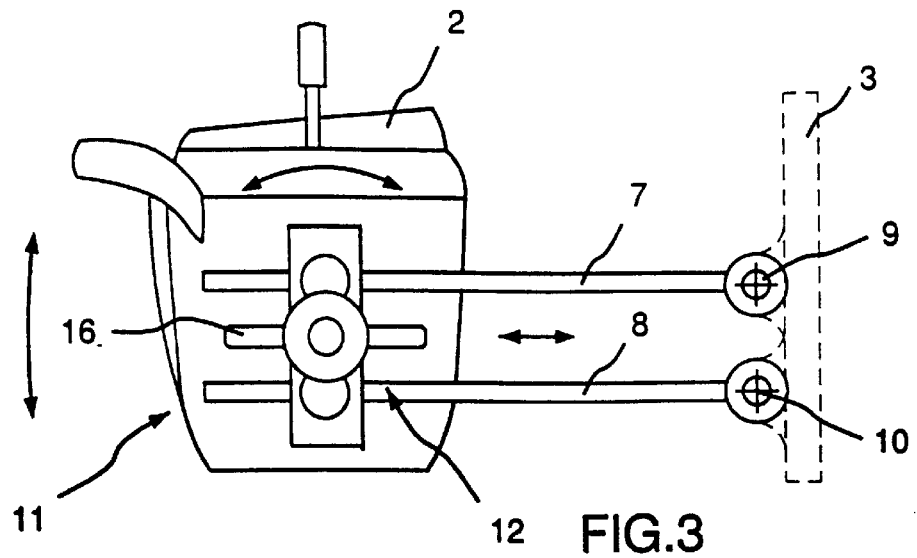
Figure 4:
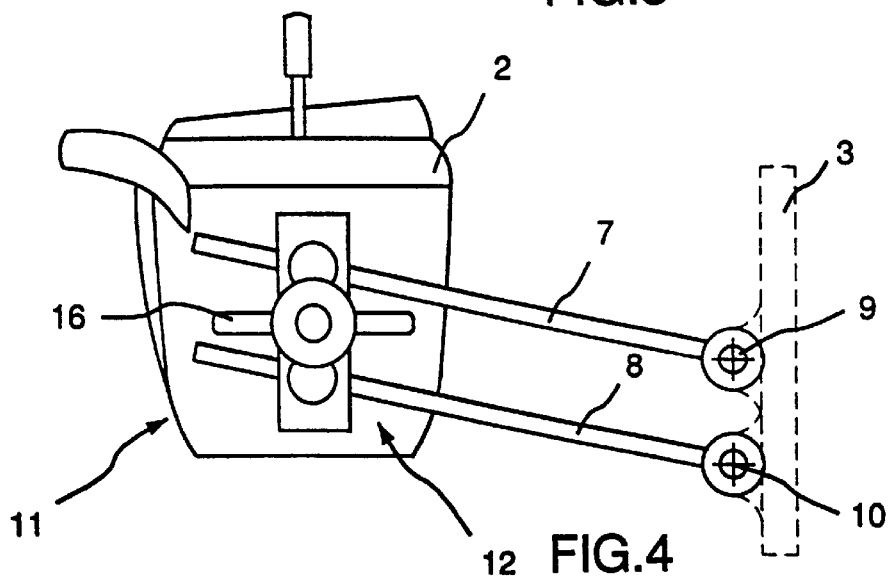
Figure 5:
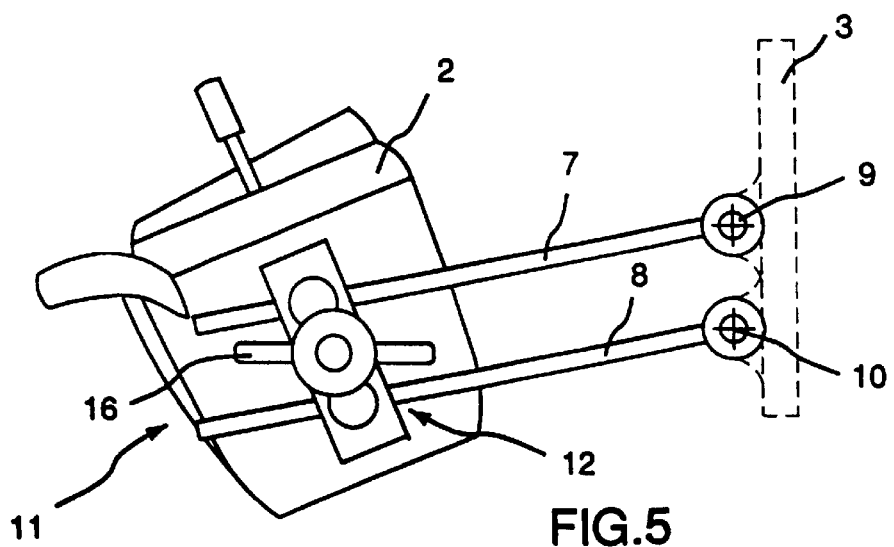

Further features and advantages of the invention are evident from the other claims and from the following description that refers to the attached drawings, where FIG. 1 shows a perspective view of a device according to the invention carried on the body of a user, FIG. 2 shows a section of a part included in the device according to the invention in perspective and with the components separated, and FIGS. 3 to FIG. 5 show end views of the device according to the invention in a somewhat simplified manner and set in different positions.

DESCRIPTION OF THE PREFERRED EMBODIMENTS

The device generally designated 1 shown in FIG. 1 is intended to be fitted to the body to carry a hand controller unit 2 for the remote control of implements, tools, robots or similar. In principle, the device includes a base section 3 in the form of a plate or cushion 4, preferably moulded to the shape of a body that, in the example shown, is attached to the body of a user by means of a hip belt 5 arranged on the plate. It should be pointed out that the device can naturally be attached to the body by means of a carrying harness or similar arrangement. A supporting arm 6 is arranged on the plate 4 in such a manner that it freely supports the said hand controller unit 2 and is provided with a means of adjusting the hand controller unit in different positions in relation to the base section 3 so that the controls of the hand controller unit 2 can be brought into a position that is comfortable for the user.

To clarify the principles of the invention, it is described as follows in a modified and somewhat simplified design but only shown from one side. As is best evident from FIGS. 3 to 5, each supporting arm 6 in principle consists of a system of arms including at least one first arm 7 and one second arm 8 that are located at a distance from one another with one above the other and where the said arms at 9 and 10 respectively are joined by pivoting connections with the base section 3, here indicated by dashed lines, so that they can pivot around an axis that is essentially horizontal when seen from the working position of the hand controller unit 2. The hand controller unit 2 can be moved and adjusted in relation to the base section 3 guided by the directional and guidance device generally designated 11 that is active between one respective free end of the first respective second arm 7, 8 and the side section of the hand controller unit 2. In addition, a device 12 for locking the first and second arms 7, 8 included in the supporting arm to the hand controller unit 2 by fixing the positions of the said arm parts to the hand controller unit 2 is also arranged on the directional and guidance device 11.

As the first and second arm parts 7 and 8 respectively that form the supporting arm 6 are located at a distance from one another, a type of double link arm system is obtained that, in contrast to an equivalent single supporting arm, has the advantage that the arms included in the system in principle bear linear loadings, i.e. they only act as pulling or pushing rods and are thus not exposed to bending influences that, from a point of view of loading, are regarded as being significantly more critical. With devices known to date, such bending stresses give rise to size problems and, for that reason, heavy and bulky arm constructions.

In this context, it should be realised that a large proportion of the weight and therefore the bending moment that the supporting arms have to accommodate comes from the hands and lower arms of the user resting on the upper side of the hand controller unit 2. By means of the design according to the invention, it is thus possible to achieve a supporting arm 6 that is lightweight, cheap to manufacture and that in an easy manner using a simple turn of the hand can be locked in the desired position, which will be described in more detail below. The said first and second arm parts 7, 8 are suitably made from a wire-like or rod-like material with a small diameter of preferably steel or plastic material.

As is shown in FIG. 2, the directional and guidance device 11 for the free end of the first 7 and second 8 arm as well as the device 12 for locking the said arm parts to the hand controller unit are arranged in one and the same arrangement. This arrangement in principle consists of clamping devices that abut one another in the form of a plate 13 firmly attached to the hand controller unit 2 and a moveable pressure plate 14 that can abut the said attached plate via a screw device. The screw device includes a pin 15 provided with a thread that extends from the attached plate 13 and runs through a hole 16 in the moveable plate 14 to interact with a knob 17. Between them, the two said plates 13, 14 support two transverse axle pins 18 and 18' respectively that each interact with an arm 7 respective 8 included in the supporting arm 6, whereby the plates 13, 14 are each provided with facing holes 19, 19' and 20, 20' respectively to support the axle pins 18, 18' and through which the respective end sections of the said axle pins extend and are accommodated. It should be realised that at the same time, the axle pins 18, 18' also form a device for guiding the plates 13, 14 in relation to one another. Each of the said axle pins 18, 18' is provided with a hole 21 and 22 respectively in its centre through which the free end of the first 7 respective second 8 arm extends and is accommodated.

FIG. 1 shows a preferred embodiment of the device according to the invention, and it should be evident from this that it includes a first supporting arm 6 and a second supporting arm 6' arranged on either side of the hand controller unit 2 so that between them they support the unit. In the preferred embodiment, the first upper arms 7 seen in the figure and the second lower arms 8 seen in the figures, and that are included in the supporting arms 6, 6', have been given a bow-formed shape that smoothly and at a distance extends along the bordering surface of the outer contour of the hand controller unit 2 that faces the body of the user. In this design, the hand controller unit 2 is thus supported between the shank-shaped parts of the bow-shaped arms 7, 8 and the said bow-shaped parts are joined by pivoting connections with the base section 3 in the waist section that unites the shank-shaped parts.

The arrangement described above functions in the following way:

When the knob 17 is in a screwed out position where the moveable pressure plate 14 does not abut the attached plate 13, and where the arms 7, 8, as should be realised, are also not in a position where they are clamped between the said plates, the hand controller unit is free to move and be adjusted in the manner shown in FIGS. 3 to 5. More specifically, the hand controller unit 2 can, with a simple turn of the hand, be adjusted in three main directions of movement, namely away from and towards the body of the user by moving it in an axial direction along the arms 7, 8, in height by pivoting it around the jointed connections 9, 10 of the arms 7, 8 with the base section 3, and by tilting away from and towards the body within a limited angle by pivoting it around its own main axis, i.e. an axis extending through the hand controller unit 2 and the directional and guidance devices for arms 7, 8. When the hand controller unit 2 has been brought into the desired position, it is locked in this position by means of the knob 17, whereby the moveable pressure plate 14 is brought to abut with the attached pressure plate 13 with the first and the second arm 7 and 8 respectively being clamped in position between the said plates and as such also fixed in position to the hand controller unit 2.

The present invention is not limited to that described above and shown in the drawings but can be changed and modified in a number of different ways within the concept of the invention as specified in the following claims.

What is claimed is:

1. In an apparatus for supporting about the waist of a body, said apparatus having a hand controller unit for the remote control of implements, tools and robots, including a base section and means for attachment of the base section to the body, at least one supporting arm arranged on the base section supporting said hand controller unit and arranged to allow adjustment of the position of the controller unit in relation to the base section, the improvement which comprises that each supporting arm comprises a first arm and a second arm that are located at a distance from one another and one above the other, wherein each of said first and second arms is linked to the base section by jointed connections to allow pivoting around an essentially horizontal axis when seen from the point of view of the operating position of the hand controller unit, a device that is active between respective free ends of said first arm and said second arm including said controller unit by which device said hand controller unit is moveable in relation to the base section and is guided axially on said first arm and said second arm for sliding along said first and second arms and articulately joint connected to said first arm and said second arm for pivoting the hand controller unit around its own axis in relation to said first and second arms, and means for locking the first and second arms to the hand controller unit in order to bring the hand controller unit to a fixed position in relation to the base section whereby the first and second arms act as pulling or pushing rods and bear linear loadings and the controller unit can be moved and adjusted in relation to the body of a user.

2. The apparatus according to claim 1 wherein said first and second arms are bow-shaped arms and the hand controller unit is supported between the free ends of the bow-shaped arms.

3. The apparatus according to claim 1, wherein said locking means comprises a clamping device through which the free ends of the first and second arms extend.

4. The apparatus according to claim 3, wherein said clamping device includes two opposing plates in the form of a plate firmly attached to the hand controller unit and a removable plate is provided with holes in which axle pins extend through and are accommodated, whereby the attached plate is provided with a threaded pin that extends through a hole in the removable plate and with which interacts with said threaded pin.

* * * * *